(12) United States Patent
Wang et al.

(10) Patent No.: US 9,230,162 B2
(45) Date of Patent: Jan. 5, 2016

(54) IDENTIFICATION CONTROL METHOD AND SYSTEM FOR VALUABLE DOCUMENT

(71) Applicants: Rongqiu Wang, Guangdong (CN); Tuowen Xiang, Guangdong (CN); Chaoyang Xu, Guangdong (CN)

(72) Inventors: Rongqiu Wang, Guangdong (CN); Tuowen Xiang, Guangdong (CN); Chaoyang Xu, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 52 days.

(21) Appl. No.: 14/233,708

(22) PCT Filed: Oct. 31, 2012

(86) PCT No.: PCT/CN2012/083797
§ 371 (c)(1),
(2) Date: Jan. 17, 2014

(87) PCT Pub. No.: WO2013/135051
PCT Pub. Date: Sep. 19, 2013

(65) Prior Publication Data
US 2014/0185908 A1    Jul. 3, 2014

(30) Foreign Application Priority Data

Mar. 14, 2012  (CN) .......................... 2012 1 0067815

(51) Int. Cl.
*G06K 9/00*    (2006.01)
*G07D 11/00*    (2006.01)

(52) U.S. Cl.
CPC ........ *G06K 9/00469* (2013.01); *G07D 11/0066* (2013.01); *G07D 11/0069* (2013.01); *G07D 11/0078* (2013.01); *G07D 11/0084* (2013.01)

(58) Field of Classification Search
USPC ....................................................... 382/135
See application file for complete search history.

(56) References Cited

U.S. PATENT DOCUMENTS 7,040,476 B2 *  5/2006  Sugano et al. ................ 194/206
7,086,950 B2    8/2006  Gordon et al.

(Continued)

FOREIGN PATENT DOCUMENTS

CN    101625777 A    1/2010
CN    101777205 A    7/2010

(Continued)

OTHER PUBLICATIONS

Australian Notice of Acceptance dated Dec. 1, 2014 from corresponding Australian Application No. 2012373050.

(Continued)

*Primary Examiner* — Yon Couso
(74) *Attorney, Agent, or Firm* — Wolf, Greenfield & Sacks, P.C.

(57) ABSTRACT

An identification control method and system for a valuable document. The system comprises a collection part, an identification part, a control part, a transmission part and an upper computer. In the identification part, complete identification information about a valuable document is split into basic identification information and high-grade identification information. Only the basic identification information which is required by the control part is sent to the control part, and the information which is not required by the control part is directly sent to the upper computer by the identification part. The identification part only transmits the basic identification information to the control part, the data transmission amount is one-tenth of the original data transmission amount, and the transmission speed can be increased by 10 times, thereby solving the problem that a valuable document cannot be quickly processed continuously because the serial transmission speed between the control part and the identification part is slow.

10 Claims, 6 Drawing Sheets

(56) References Cited

U.S. PATENT DOCUMENTS

| | | | |
|---|---|---|---|
| 7,201,320 B2* | 4/2007 | Csulits et al. | 235/462.01 |
| 8,459,436 B2* | 6/2013 | Jenrick et al. | 194/206 |
| 2010/0001452 A1 | 1/2010 | Watanabe | |
| 2011/0172808 A1 | 7/2011 | Fu et al. | |

FOREIGN PATENT DOCUMENTS

| | | |
|---|---|---|
| CN | 102314735 A | 1/2012 |
| CN | 102646298 A | 8/2012 |
| JP | 2004151833 A | 5/2004 |
| JP | 2005044040 A | 2/2005 |
| JP | 2006004282 A | 1/2006 |
| JP | 2007156760 A | 6/2007 |

OTHER PUBLICATIONS

International Search Report dated Jan. 31, 2013 from corresponding International Application No. PCT/CN2012/083797.

Extended European Search Report and European Search Opinion dated Jan. 28, 2015 from corresponding European Application No. 12871520.

Watson, R.T., Data Management: Databases and Organizations, vol. 5, Aug. 26, 2005, pp. 1-30, XP007919585.

* cited by examiner

IDENTIFICATION CONTROL METHOD AND SYSTEM FOR VALUABLE DOCUMENT

CROSS REFERENCE TO RELATED APPLICATIONS

This application is the National Stage application of international application number PCT/CN2012/083797, filed on Oct. 31, 2012, which claims the priority of Chinese Patent Application No. 201210 067815.2, filed with the Chinese State Intellectual Property Office on Mar. 14, 2012, both of which applications are hereby incorporated by reference to the maximum extent allowable by law.

FIELD OF THE INVENTION

The present invention relates to the field of communication technology, and in particular to a method and system for identifying and controlling a valuable document.

BACKGROUND OF THE INVENTION

A valuable document, such as banknote, has a very large circulation amount in people's lives, and has been applied in a very wide range, such that it is very important to identify and control the valuable documents, such as banknotes quickly.

Figure 1:
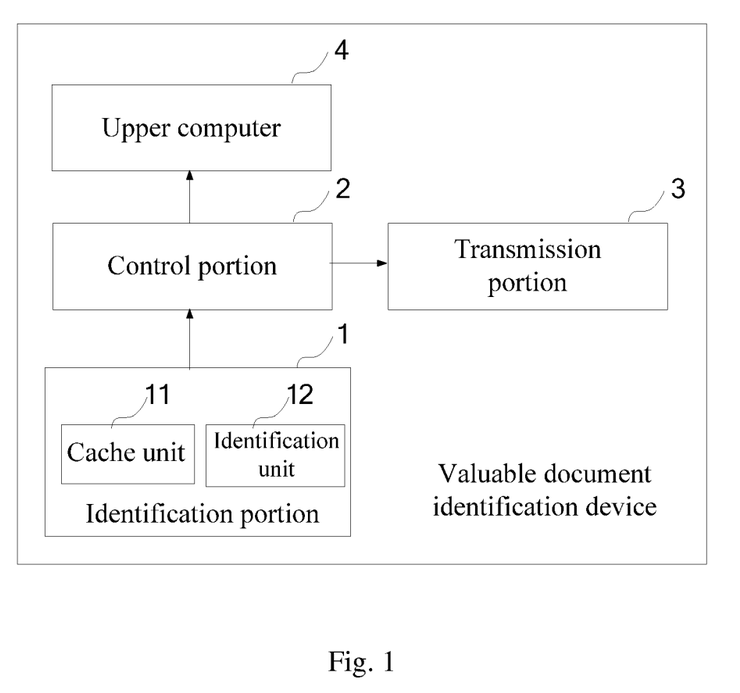
FIG. 1 is an valuable document identification device in the prior art.

Presently, as shown in FIG. 1, the existing valuable document identification device includes an identification portion 1, a control portion 2, a transmission portion 3 and an upper computer 4. The identification portion 1 includes an identification unit 11 and a cache unit 12. The identification unit 11 is adapted to identify information of a valuable document and store the identified information of the valuable document in the cache unit 12; the control portion 2 is adapted to send a control instruction to the transmission portion 3 according to the information of the valuable document; the transmission portion 3 is adapted to transmit the valuable document to a corresponding position; and the upper computer 4 is adapted to store the complete identified information and control information.

A brief introduction to the working mode of the existing valuable document identification device is made hereinafter in conjunction with FIG. 1:

1. The identification unit 11 of the identification portion 1 identifies information of the valuable document and stores the complete identified information in the cache unit 12;

2. The complete identified information of the valuable document stored in the cache unit 12 is transmitted to the control portion 2 via a serial port, such that the control portion 2 obtains the complete identified information of the valuable document;

3. The control portion 2 performs a logic control calculation based on basic identified information to obtain a control instruction, in which the basic identified information is a part of identified information that is required by the control portion in the complete identification information of the valuable document; and the residual identified information is marked as advanced identified information;

4. The control portion 2 sends a control instruction to the transmission portion 3;

5. The transmission portion 3 transmits the valuable document to a corresponding position after receiving the control instruction;

6. The control portion 2 uploads both the complete identified information and control information to the upper computer 4 via an Universal Serial Bus (USB) interface; and 7. The upper computer 4 records all information uploaded by the control portion 2 and records the upload time.

In the research and practice process of the prior art, the following problems of the prior art have been found:

The communication between the identification portion 1 and the control portion 2 is a serial port communication, and the transmission speed of the serial port communication is 57600 bit per second, i.e. about 56 Kb per second. Therefore, the data transmission speed from the identification portion 1 to the control portion 2 is slow. In the case that the valuable document identification device processes 8 valuable documents per second, there is a small amount of data sent from the identification portion 1 to the control portion 2, the identification process can be operated in a low transmission speed, and thus the existing working mode can satisfy the demand in which a small amount of data is processed. However, in the case that the valuable document identification device processes 20 or more valuable documents per second, the amount of data sent from the identification portion 1 to the control portion 2 per second is much greater than 56 Kb, the identification portion 1 cannot send the complete identified information to the control portion 2 in time, thus resulting in a low running speed of the entire valuable document identification device. Therefore, the operating efficiency of the entire device will be reduced greatly when a large amount of data is transmitted in the existing working mode.

Therefore, currently, a problem to be solved is how to improve the operating efficiency of the valuable document identification device.

SUMMARY OF THE INVENTION

In view of this, an object of the present invention is to provide a method and system for identifying and controlling a valuable document, so as to improve an operating efficiency of a valuable document identification device.

An embodiment of the present invention is implemented as follows.

A system for identifying and controlling a valuable document is provided, which includes an acquisition portion, an identification portion, a control portion, a transmission portion and an upper computer;

the acquisition portion is configured to acquire image data of the valuable document;

the identification portion is configured to identify the image data to obtain complete identification information of the valuable document; divide the complete identification information into basic identification information and advanced identification information which have a same label; send the basic identification information with the label to the control portion and send the advanced identification information with the label to a cache memory; and send the advanced identification information with the label to the upper computer via an information transmission device after all valuable documents are identified;

the control portion is configured to perform a logic control calculation according to the basic identification information with the label to obtain control information; convert the control information into a control instruction and send the control instruction to the transmission portion; and combine the basic identification information with the label and the control information into combination information with the label, and send the combination information with the label to the upper computer;

the transmission portion is configured to transmit the valuable document to a preset position according to the control instruction; and the upper computer is configured to merge the advanced identification information into the combination information which has the same label with the advanced identification information.

Preferably, in the above system for identifying and controlling a valuable document, the information transmission device is an USB interface.

Preferably, in the above system for identifying and controlling a valuable document, the preset position is a normal banknote box, a banknote outlet or a banknote recycling box.

A method for identifying and controlling a valuable document is provided, which includes:

acquiring image data of a current valuable document, and identifying the image data to obtain complete identification information of the valuable document;

dividing the complete identification information into basic identification information and advanced identification information, and assigning one label to the basic identification information and advanced identification information of the valuable document;

performing a logic control calculation according to the basic identification information to obtain control information, converting the control information into a control instruction, and transmitting the valuable document to a preset position according to the control instruction;

combining the basic identification information with the label and the corresponding control information into combination information with the label, and uploading the combination information to an upper computer; and merging the advanced identification information with the combination information in accordance with the label after all valuable documents are identified.

Preferably, in the above method for identifying and controlling a valuable document, the label is a numeric label.

Preferably, in the above method for identifying and controlling a valuable document, the numeric label is reset to zero for recounting when the numeric label reaches a preset value.

Preferably, in the above method for identifying and controlling a valuable document, the complete identification information includes a currency type, a denomination, an authenticity, crown word number information, a fare clearing parameter and various intermediate identification results for analyzing a simulation running process.

Preferably, in the above method for identifying and controlling a valuable document, the complete identification information further includes orientation information.

Preferably, in the above method for identifying and controlling a valuable document, the basic identification information includes: a currency type, a denomination, an authenticity, and a fare clearing parameters; and the advanced identification information includes: crown word number information and various intermediate identification results for analyzing the simulation running process.

Preferably, in the above method for identifying and controlling a valuable document, the basic identification information further includes: orientation information.

Compared with the prior art, the technical solution provided by the embodiment of the present invention has the following advantages and features.

In the solution provided by the present disclosure, the complete identification information of the valuable document is divided into the basic identification information and the advanced identification information in the identification portion, and only the basic identification information required by the control portion is sent to the control portion, and information which is not required by the control portion is directly sent to the upper computer by the identification portion. Since the identification portion sends only the basic identification information to the control portion, the data transmission amount is one-tenth of the original data transmission amount, and the transmission speed can be increased by 10 times. Therefore, the solution provided by the present invention can solve the problem that the valuable documents cannot be processed continuously and rapidly due to the lower serial transmission speed between the control portion and the identification portion.

DETAILED DESCRIPTION OF THE INVENTION

The technical solution in the embodiments of the present invention will be described clearly and completely hereinafter in conjunction with drawings in the embodiments of the present invention, obviously, the described embodiments are only a part of the embodiments of the present invention, rather than all embodiments. Other embodiments that are obtained by those skilled in the art based on the embodiments in the present invention without any creative work are all belong to the scope of protection of the present invention.

An embodiment of the present invention provides a system for identifying and controlling a valuable document, which includes an acquisition portion, an identification portion, a control portion, a transmission portion, and an upper computer. The acquisition portion is configured to acquire image data of the valuable document. The identification portion is configured to identify the image data to obtain complete identification information of the valuable document; divide the complete identification information into basic identification information and advanced identification information which have a same label; send the basic identification information with the label to the control portion and send the advanced identification information with the label to a cache memory; and send the advanced identification information with the label to the upper computer via an information transmission device after all valuable documents are identified. The control portion is configured to perform a logic control calculation according to the basic identification information with the label to obtain control information; convert the control information into a control instruction and send the control instruction to the transmission portion; combine the basic identification information with the label and the control information into combination information with the label; and send the combination information with the label to the upper computer. The transmission portion is configured to transmit the valuable document to a preset position according to the control instruction. The upper computer is configured to merge the advanced identification information into the combination information which has the same label with the advanced identification information.

There are many ways to specifically implement the system for identifying and controlling a valuable document, which will be described in detail hereinafter by means of specific embodiments.

Figure 2:
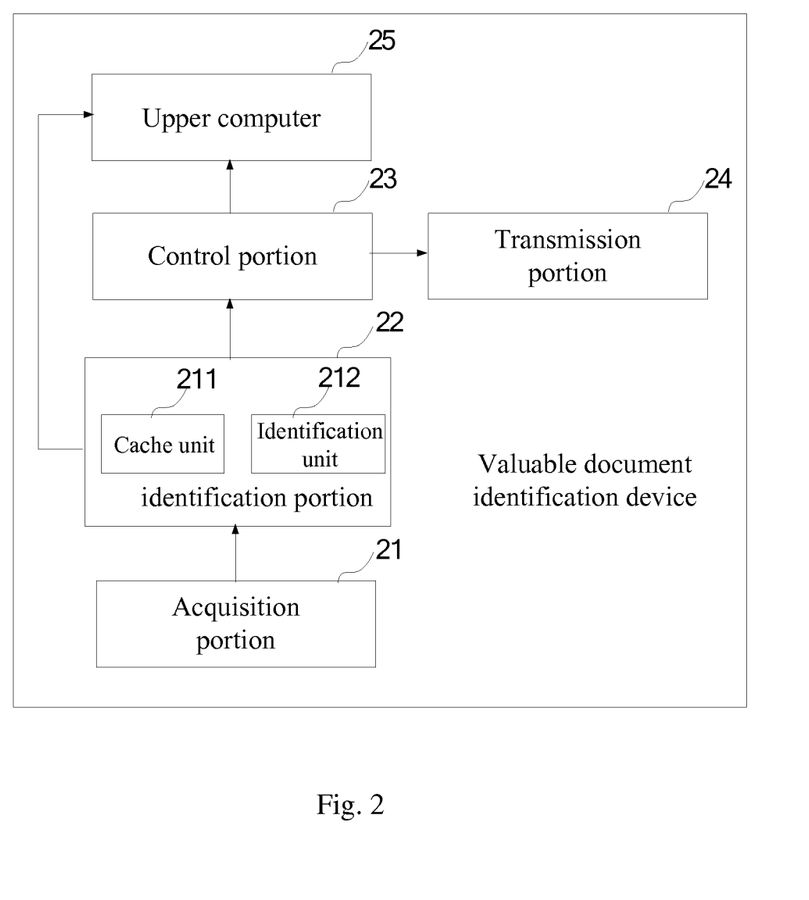
FIG. 2 is a block diagram of a system for identifying and controlling a valuable document according to the present invention.

Referring to FIG. 2, which shows a system for identifying and controlling a valuable document according to the invention. The system is mainly configured to identify banknotes, which includes: an acquisition portion 21, an identification portion 22, a control portion 23, a transmission portion 24 and an upper computer 25. The identification portion 22 includes an identification unit 212 and a cache unit 211. The acquisition portion 21 is configured to acquire image data of a banknote. The identification unit 212 of the identification portion 22 is configured to identify the image data to obtain complete identification information of the banknote; divide the complete identification information into basic identification information and advanced identification information which have a same label; send the basic identification information with the label to the control portion 23 and send the advanced identification information with the label to the cache unit 211; and sends the advanced identification information with the label to the upper computer 25 via an information transmission device after all banknotes are completed. The control portion 23 is configured to perform a logic control calculation according to the basic identification information with the label to obtain control information; convert the control information into a control instruction and send the control instruction to the transmission portion 24; and combine the basic identification information with the label and the control information into combination information with the label, and send the combination information with the label to the upper computer 25. The transmission portion 24 is configured to transmit the banknote to a position, such as a normal banknote box, a banknote outlet or a banknote recycling box, according to the control instruction. The upper computer 25 is configured to merge the advanced identification information into the combination information which has the same label with the advanced identification information.

In the embodiment shown in FIG. 2, the identification portion 22 divides the complete identification information of the valuable document into the basic identification information and the advanced identification information, only sends the basic identification information required by the control portion 23 to the control portion 23, and directly sends information that the control portion 23 does not require to the upper computer 25. In this way, the identification portion 22 sends only the basic identification information to the control portion 23, the data transmission amount is one-tenth of the original data transmission amount, and the transmission speed can be increased by 10 times, Therefore, the solution provided by the present invention can solve the problem that the valuable documents cannot be processed continuously and rapidly due to the lower serial transmission speed between the control portion 23 and the identification portion 22.

In the embodiment shown in FIG. 2, an information transmission device can be provided in the identification portion 22, so as to send the advanced identification information to the upper computer 25 via the information transmission device. Specifically, the information transmission device can be an USB interface.

Figure 3:
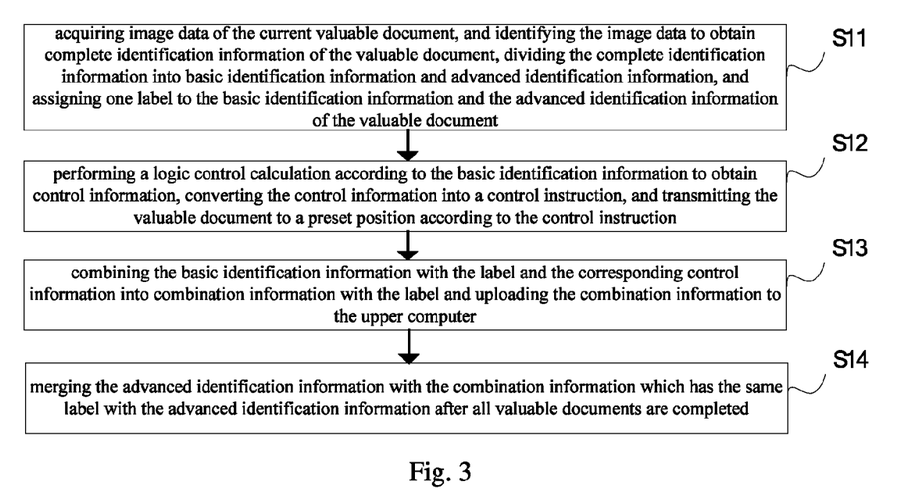
FIG. 3 is a flow chart of a method for identifying and controlling a valuable document according to the present invention.

Referring to FIGS. 2 and 3, FIG. 3 shows a method for identifying and controlling a valuable document, which includes the following steps.

Step S11, acquiring image data of the current valuable document, identifying the image data to obtain complete identification information of the valuable document, dividing the complete identification information into basic identification information and advanced identification information, and assigning one label to the basic identification information and advanced identification information of the valuable document.

In the step S11, the identification unit 212 of the identification portion 22 identifies the acquired data of the valuable document by using an identification algorithm such as BP neural network, SVM, so as to obtain complete identification information of the valuable document. The complete identification information includes a currency type, a denomination, an orientation, an authenticity, crown word number information, a fare clearing parameters and various intermediate identification results for analyzing a simulation running process. Since the control portion 23 needs only a part of the identification information, rather than the complete identification information, the identification portion 22 sends to the control portion 23 the identification information required by the control portion 23. In this way, the data transmission amount is only one-tenth of the original data transmission amount, and the transmission speed is increased by 10 times. The identification information required by the control portion 23 is defined as the basic identification information, which includes: the currency type, the denomination, the orientation, the authenticity, etc.; the remaining identification information is defined as the advanced identification information, which includes: the crown word number information, the fare clearing parameters, and various intermediate identification results for analyzing the simulation running process.

Figure 4:
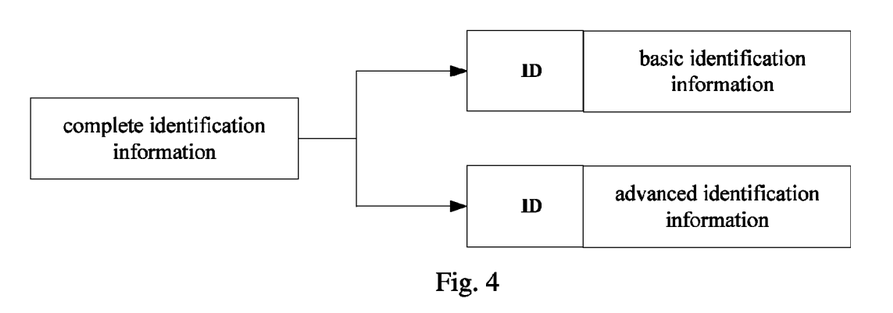
FIG. 4 is a schematic diagram of the dividing of the complete identification information provided by the present invention.

Referring to FIG. 4, a piece of complete identification information is divided into two parts: basic identification information and advanced identification information, and a same ID is respectively added to the fronts of the basic identification information and the advanced identification information in the same group, and the ID is a numeric label. The basic identification information with the ID is uploaded to the control portion 23, and the advanced identification information with the ID is stored in the cache unit 211.

Figure 5:
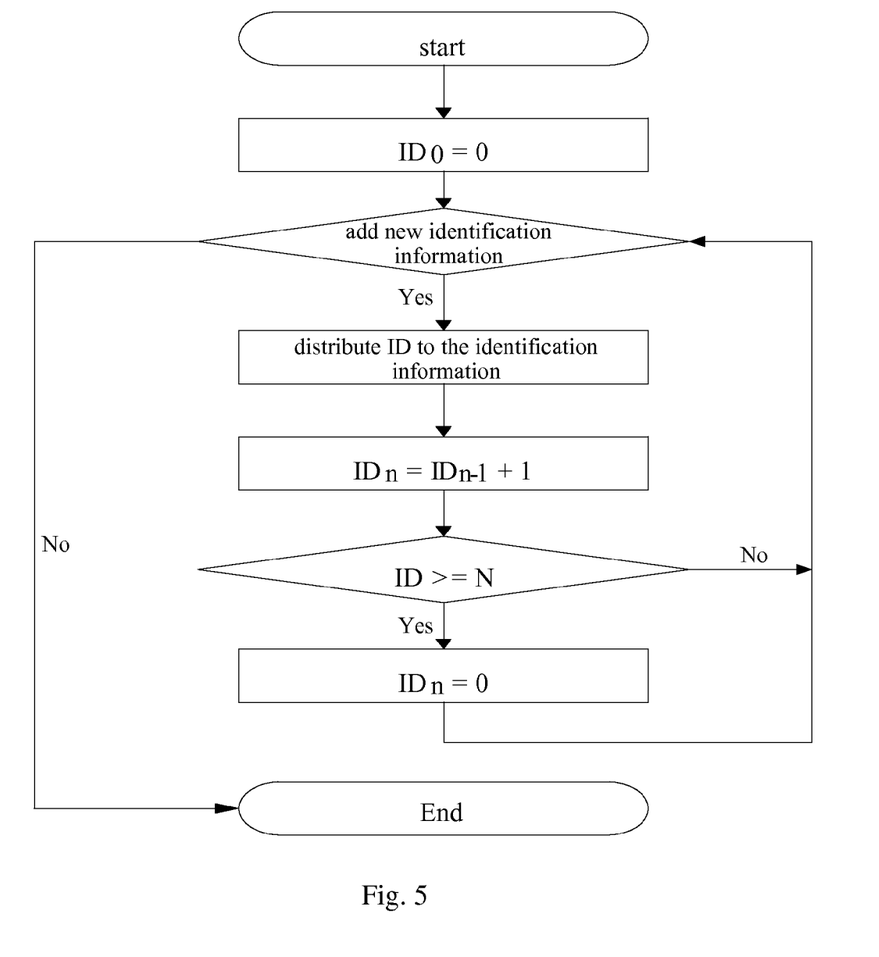
FIG. 5 is an flow chart of a method for distributing a circular ID provided by the present invention.

As shown in FIG. 5, when the system is started, ID0=0. Once a valuable document enters the system, one piece of complete identification information is added by the identification portion, and the identification information is divided into basic identification information and advanced identification information, and a current ID is distributed to the basic identification information and the advanced identification information in this group. The ID is added by 1 to distinguish information of this group from information of other groups, i.e. $ID_n=ID_{n-1}+1$; if ID>=N (in the present example, N=100,000,000), the ID is reset to 0, so as to prevent abnormal error due to too large ID. It should ensure that in a period (one day in this example), the IDs of the basic identification information and the advanced identification information in the same group of complete identification information are the same, and the IDs of the identification information in the different groups are different. Assuming that 20 banknotes is processed per second and the continuous working time is 24 hours for one day, the amount of the processed valuable documents is no more than 2000000. As can be seen, the valuable documents processed in one day is less than 100000000, and when N=100000000 in the present example, the ID of the identification information in a group will be different from that in other groups in one day.

Step S12, performing a logic control calculation according to the basic identification information to obtain control information, converting the control information into a control instruction, and transmitting the valuable document to a preset position according to the control instruction.

Figure 6:
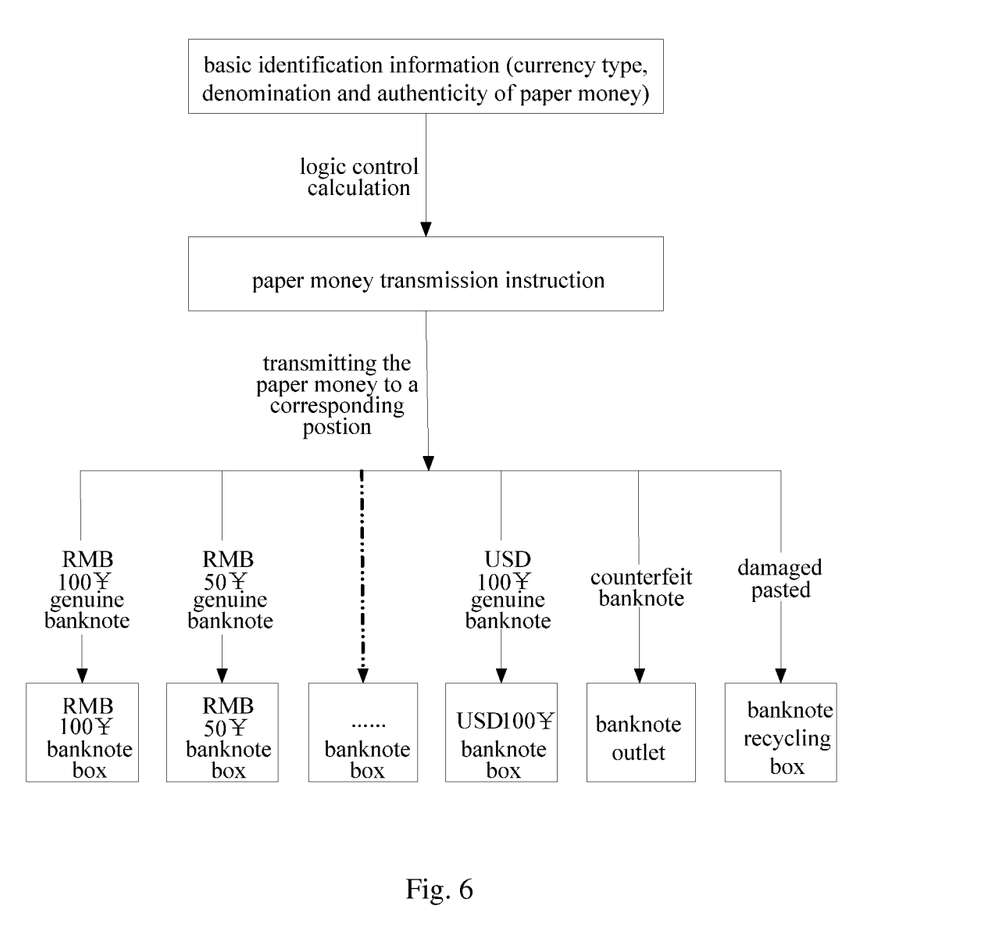
FIG. 6 is a schematic diagram of the dispensing of the valuable document provided by the present invention.

Referring to FIG. 6, in step S12, the control portion performs the logic control calculation according to the basic identification information uploaded by the identification portion, and sends an instruction to the transmission portion such that paper money is transmitted to a corresponding position. The corresponding position includes: various normal banknote boxes (such as a banknote box of RMB 50 Yuan, a banknote box of USD 100 dollar), banknote outlets, and banknote recycling boxes. If the authenticity information in the basic identification information indicates that the paper money is a genuine banknote, the control portion sends a genuine banknote transmission instruction to the transmission portion, the transmission portion transmits the paper money to a normal banknote box of the corresponding currency type and denomination; if it is a counterfeit banknote, the control portion sends a counterfeit banknote transmission instruction, the transmission portion conveys the paper money to the banknote outlet, and the customer get it back; if the banknote is paper money that is unsuitable for circulation, such as damaged paper money or pasted paper money, a recycling instruction is sent so that the transmission portion transmits the paper money to the banknote recycling box.

For example, in the case that paper money X1 is a genuine banknote of RMB 50 Yuan, the control portion sends an instruction to the transmission portion according to the basic identification information (RMB, 50 Yuan, genuine banknote), and the banknote X1 is conveyed to a banknote box of RMB 100 Yuan. In the case that paper money X2 is a counterfeit banknote of USD 100 dollar, the control portion sends an instruction to the transmission portion according to the basic identification information (USD, 100 dollar, counterfeit banknote) and the transmission portion conveys the banknote X2 to a banknote outlet.

Step S13, combining the basic identification information with the label and the corresponding control information into combination information with the label, and uploading the combination information to the upper computer.

Figure 7:
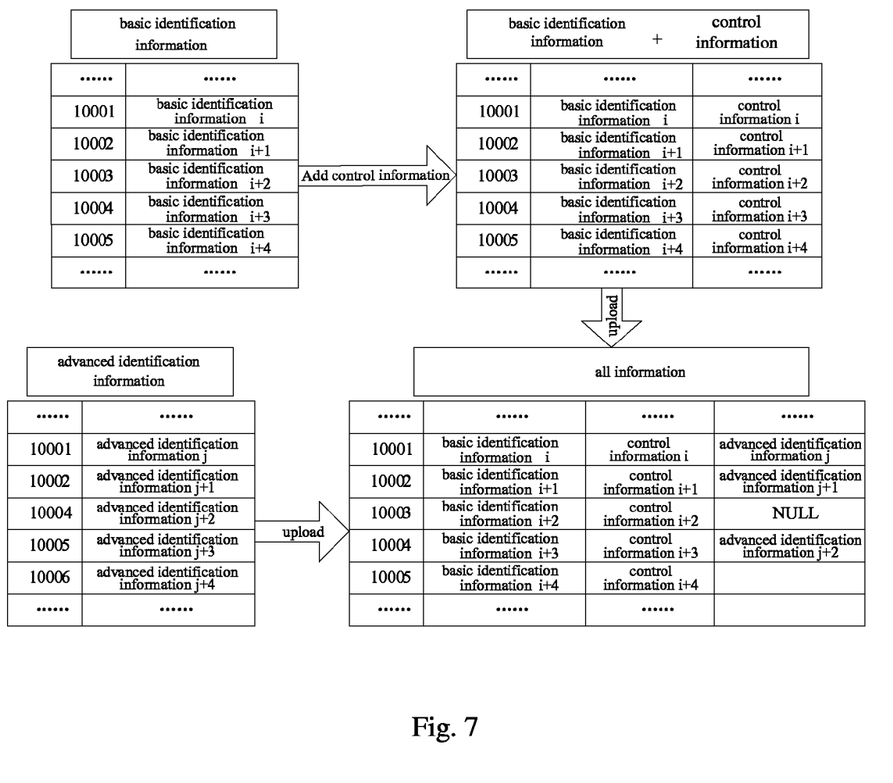
FIG. 7 is a schematic diagram of information combination provided by the present invention.

As shown in FIG. 7, in the step S13, the control portion performs a logic control calculation according to the basic identification information uploaded by the identification portion, and sends an instruction to the transmission portion, in which the control instruction converted by the control information includes the serial number of the banknote box where the banknote enters, etc. After sending the instruction to the transmission portion, the control portion combines this basic identification information and the control information obtained by this basic identification information into combination information, takes the ID of the basic identification information as the ID of the combination information, and sends the combination information to the upper computer.

Step S14, merging the advanced identification information with the combination information which has the same label with the advanced identification information after all valuable documents are identified.

In step S14, after the device processes a batch of valuable documents, the basic identification information and control information corresponding to each banknote have been uploaded to the upper computer, and all advanced identification information are stored in the cache unit of the identification portion. Before the next batch of valuable documents is processed, all the advanced identification information in the cache unit of the identification portion are uploaded to the upper computer via an USB transmission interface, and each advanced identification information having an ID number. Referring to FIG. 7, the control portion combines the basic identification information with the control information and uploads the combined information to the upper computer, where the basic identification information sharing the ID with the control information. The upper computer receives the basic identification information and the control information, and reserves a certain space for the advanced identification information for each received information. When receiving the advanced identification information, the upper computer determines whether the ID of the advanced identification information is equal to the ID of the basic identification information, if the ID of the advanced identification information is equal to the ID of the basic identification information, the advanced identification information is inserted into a corresponding position, otherwise the advanced identification information is discarded. If there are no an advanced identification information part at some information, the advanced identification information part are set to NULL.

In summary, in the operating mode, the identification portion transmits only basic identification information to the control portion, the data transmission amount is one-tenth of the original data transmission amount, and the transmission speed can be improved by 10 times. This can solve the problem that the valuable documents cannot be processed continuously and rapidly due to the lower serial transmission speed in the operating mode. Based on this transmission mode, the device can process 80 valuable documents per second. In a standby mode, the advanced identification information stored in the cache unit of the identification portion is uploaded to the upper computer, and the information amount of the advanced identification information is 9 times the basic identification information. Since the speed of the USB transmission is 400 times of the speed of the serial port transmission, in the operating mode, the serial port communication time occupies only about 2% of the entire processing time, and in the standby mode, all the time is used for data transmission. Therefore, the actual speed is 400÷2%=20000 times of the transmission speed of the serial port communication. In the case that the information amount is 9 times of the basic identification information, the amount of the valuable documents to be processed can be increased by two thousand times. Assuming that the valuable documents are processed at a speed of 20 valuable documents per second in the operating state, then the advanced identification information of 2k*20=40 thousand valuable documents can be transmitted per second in the standby mode. If the number of each batch of valuable documents is 4000, only an interval of 0.1 second is required between the two batches of valuable documents for completing the transmission of all the advanced identification information. Therefore, the interval will not affect the processing of the valuable documents. Moreover, the present invention uses a circular ID to solve the information synchronization problem in the case of DSP without the clock.

It should be noted that the embodiments shown in FIG. 2 to FIG. 7 are only preferred embodiments of the present invention. Those skilled in the art can design more embodiments based on this, which will not be described in detail herein.

Various modifications to these embodiments will be apparent to those skilled in the art, and the generic principles defined herein can be implemented in other embodiments without departing from the spirit or scope of the present invention. Accordingly, the present invention will not be limited to these embodiments shown herein, but is in accordance with the widest scope consistent with the principles and novel features disclosed herein.

The invention claimed is:

1. A system for identifying and controlling a valuable document, comprising:
an acquisition portion, an identification portion, a control portion, a transmission portion and an upper computer; wherein
the acquisition portion is configured to acquire image data of the valuable document;
the identification portion is configured to identify the image data to obtain complete identification information of the valuable document; divide the complete identification information into basic identification information and advanced identification information which have a same label; send the basic identification information with the label to the control portion and send the advanced identification information with the label to a cache memory; and send the advanced identification information with the label to the upper computer via an information transmission device after all valuable documents are identified;
the control portion is configured to perform a logic control calculation according to the basic identification information with the label to obtain control information; convert the control information into a control instruction and send the control instruction to the transmission portion; and combine the basic identification information with the label and the control information into combination information with the label, and send the combination information with the label to the upper computer;
the transmission portion is configured to transmit the valuable document to a preset position according to the control instruction; and
the upper computer is configured to merge the advanced identification information into the combination information which has the same label with the advanced identification information.

2. The system for identifying and controlling a valuable document according to claim 1, wherein the information transmission device is a USB interface.

3. The system for identifying and controlling a valuable document according to claim 1, wherein the preset position is a normal banknote box, a banknote outlet or a banknote recycling box.

4. A method for identifying and controlling a valuable document, comprising:
acquiring image data of a current valuable document, and identifying the image data to obtain complete identification information of the valuable document;
dividing the complete identification information into basic identification information and advanced identification information, and assigning one label to the basic identification information and the advanced identification information of the valuable document;
performing a logic control calculation according to the basic identification information to obtain control information, converting the control information into a control instruction, and transmitting the valuable document to a preset position according to the control instruction;
combining the basic identification information with the label and the corresponding control information into combination information with the label, and uploading the combination information to an upper computer; and
merging the advanced identification information with the combination information in accordance with the label after all valuable documents are identified.

5. The method for identifying and controlling a valuable document according to claim 4, wherein the label is a numeric label.

6. The method for identifying and controlling a valuable document according to claim 5, wherein the numeric label is reset to zero for recounting when the numeric label reaches a preset value.

7. The method for identifying and controlling a valuable document according to claim 4, wherein the complete identification information comprises a currency type, a denomination, an authenticity, crown word number information, a fare clearing parameter and intermediate identification results for analyzing a simulation running process.

8. The method for identifying and controlling a valuable document according to claim 7, wherein the complete identification information further comprises orientation information.

9. The method for identifying and controlling a valuable document according to claim 4, wherein the basic identification information comprises: a currency type, a denomination, an authenticity, and a fare clearing parameters; and
the advanced identification information comprises: crown word number information and intermediate identification results for analyzing a simulation running process.

10. The method for identifying and controlling a valuable document according to claim 9, wherein the basic identification information further comprises orientation information.

* * * * *